US005820311A

United States Patent [19]

Grün et al.

[11] Patent Number: 5,820,311

[45] Date of Patent: Oct. 13, 1998

[54] LATHE CUTTING TOOL

[75] Inventors: Erich Grün, Breitenfurt; Rolf Müller, Tübingen, both of Germany

[73] Assignee: Cerasiv GmbH Innovatives Keramik-Engineering, Plochingen, Germany

[21] Appl. No.: 674,244

[22] Filed: Jul. 1, 1996

[30] Foreign Application Priority Data

Jul. 8, 1995 [DE] Germany ........................ 195 24 945.3

[51] Int. Cl.[6] ........................ B23B 27/16

[52] U.S. Cl. ........................ 407/102; 407/104; 407/115

[58] Field of Search ........................ 407/100, 102, 407/104, 107, 108, 109, 115, 2, 5

[56] References Cited

U.S. PATENT DOCUMENTS

| | | | |
|---|---|---|---|
| 2,870,523 | 1/1959 | Richard | 407/107 X |
| 3,303,553 | 2/1967 | Severson | 407/107 X |
| 4,078,868 | 3/1978 | Erkfritz | 407/104 X |
| 5,501,256 | 3/1996 | Dyer et al. | 407/115 X |

FOREIGN PATENT DOCUMENTS

| | | | |
|---|---|---|---|
| 952701 | 8/1974 | Canada | 407/104 |
| 0075177 | 3/1983 | European Pat. Off. . | |
| 0402934 | 12/1990 | European Pat. Off. . | |
| 3740814 | 6/1989 | Germany . | |
| 590367 | 4/1959 | Italy | 407/2 |
| 50-15008 | 1/1975 | Japan . | |
| 406182605 | 7/1994 | Japan | 407/107 |
| 1250398 | 8/1986 | U.S.S.R. | 407/104 |

*Primary Examiner*—A. L. Pitts
*Assistant Examiner*—Henry W. H. Tsai
*Attorney, Agent, or Firm*—Fulbright & Jaworski

[57] ABSTRACT

Disclosed is a lathe cutting tool assembly found of a tool holder which has a seat to accommondate a cutter insert, the cutter insert being provided with a clamping groove or bore. The insert is held in the tool holder by a clamping shoe. The clamping shoe is tightly secured to on the tool holder. To protect the clamping shoe and improve the seating of the cutter insert in the tool holder, a clamping plate is secured to the clamping shoe and lies upon the cutter insert. A projection is provided on the bottom of the clamping plate facing the cutter insert and is in clamping contact with the groove or bore. The tool assembly is especially adapted for a turning chisel.

13 Claims, 6 Drawing Sheets

16 14 13 15 6 7 12 5 4 1 17 3 18 9 2 III 1
17
18
7
16
6
15
13
14
5
12
4
3
9
2
III 7
1
6
IV
2
14
3
5
IV
12
4

13
14
6
5
17
12
-15-
1
-16-
11
-9-
- 4 -
- 3 -
10
2

13
15
14
6
5
12
11
1
- 4 -
- 3 -
10
9
2

15
13
14
6
17
5
12
1
-16-
2
9
8
3

15
14
13
6
17
5
12
-16-
1
19
9
2
8
3

LATHE CUTTING TOOL

BACKGROUND OF THE INVENTION

The invention relates to a lathe cutting tool.

EP-A1 0 075 177 discloses a lathe cutting tool with a tool holder, which has a seat to accommodate a ceramic cutter insert. The cutter insert is provided with a recess for clamping which is engaged by a projection on a clamping shoe. The clamping shoe is fastened on the tool holder by a screw. The projection of the clamping shoe makes a point contact with the clamping recess, the contact being made such that a component of force draws the cutter insert into its seat. This is brought about by the fact that the point of contact is between the recess bottom and the surface of the cutter insert.

In the brochure, "Drehwerkzeuge mit integriertem Klemmsystem" (Turning Tools with Integrated Clamping System of Cerasiv GmbH Innovatives Keramik-Engineering, Produktbereich SPK-Werkzeuge, Gottlieb-Haefele-Str. 7, D-73061 Ebersbach/Fils, February 1994, page 13, there is shown, in addition to the clamping system described above, a clamping system for cutter inserts without a clamping recess. The same tool holder as described above is used. The clamping system is distinguished, however, by a pressure plate which is fastened to the clamping shoe. This pressure plate with a flat surface presses the cutter insert against the tool holder and serves only to provide pressure vertically against the cutter insert so that the cutter insert will not slip out of the tool holder.

In the relevant state of the art, i.e., in connection with clamping shoes which grip a cutter insert recess, there is the disadvantage that the area of the nose of the clamping shoe becomes eroded by the impact of the chips, i.e., an ablation of material takes place which in extreme cases causes the clamping shoe projection to break off.

The clamping shoe also is very high, so that chip removal becomes difficult. Also, especially in the case of materials producing long chips, there is the danger that a chip may become caught in the seam at the point of contact between the nose of the clamping shoe and the recess in the cutter insert. This will then result in a chip jam which can damage the workpiece surface or break the clamping shoe.

The present invention is in an improved cutting tool wherein the front end of the clamping shoe facing the workpiece is largely protected against the chips, while at the same time assuring an optimum seating of the cutter insert in the tool holder.

SUMMARY OF THE INVENTION

The above-described disadvantages of the prior art are overcome by the invention by fastening on the clamping shoe a clamping plate which rests against the cutter insert, and by providing a cain on its bottom facing the insert, which is in clamping contact with the clamping recess or bore.

Since the bottom of the clamping plate lies on top of the insert, no more than a relative movement in the plane of the upper surface of the insert can take place, so that the point of contact of the cam with the recess or bore is advantageously limited. The height of the cam on the clamping plate is selected such, according to the invention, that it is between the bottom and top of the recess. Thus the insert will always be drawn by the clamping plate and shoe into its seat. This is brought about by the fact that the clamping plate has on its upper side a ramp or notch in which the nose of the clamping shoe is engaged such that a component of force is produced in the direction of the clamping screw. Thus the clamping plate, and thus also the cutter insert, is biased toward the screw. The cam on the clamping plate contacts the groove at its sloping or curved transition from the bottom to the top of the recess.

According to the invention, the contact of the cam on the clamping plate with the recess is a point, line or surface contact. Advantageously, the cam is cylindrical, barrel-shaped or spherical. The recess must, of course, be matched to it.

The width of the clamping plate cam is less than the width of the recess or bore, so that the cam can enter into the recess or bore. The term "recess," as used herein, is also to be understood as a groove in the insert.

To protect the front end of the clamping shoe, the clamping plate advantageously covers the groove or bore at least virtually completely. To improve removal of the chips, the external shape of the clamping plate facing the workpiece has bevels merging with the top of the clamping plate in front of the clamping shoe. In this case the top of the clamping plate in front of the clamping shoe is higher than the surface of the clamping plate underneath the clamping shoe, so that the front part of the clamping shoe is protected against chips colliding with it.

The various features of novelty which characterizes the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

BRIEF DESCRIPTION OF THE INVENTION

FIG. 1 is a section of a cutting tool with cutter insert fastened in place by a clamping plate and clamping shoe;

FIG. 2 a top view of a prismatic cutter insert whose recess is covered by a clamping plate with a cam;

FIG. 3 an enlarged section of FIG. 1 taken within the circle III;

FIG. 4 a section through the clamping plate with cain and cutter insert taken along view line IV—IV of FIG. 2;

FIG. 5 a clamping plate with a cylindrical or hemispherical cam engaged in the cylindrical bore in a cutter insert; and FIG. 6 a clamping plate with a hemispherical cam engaged in a spherical bore in a cutting plate.

DESCRIPTION OF PREFERRED EMBODIMENT

Figure 1:
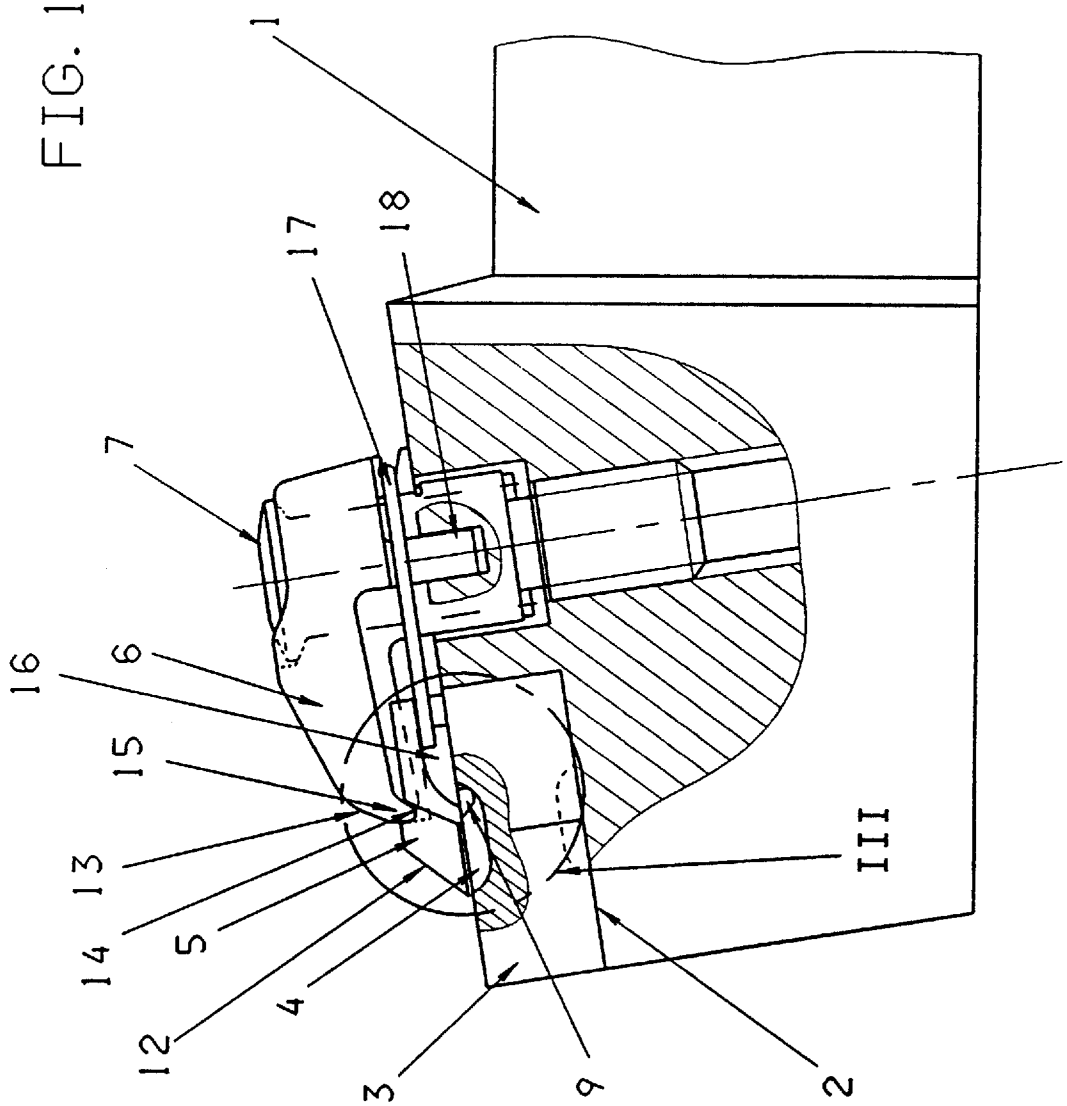

FIG. 1 shows a section of a cutting tool with a tool holder 1. Holder 1 has a recess 2 to accommodate a cutter insert 3. On the top of the insert 3 the latter is provided with a recess 4 which is engaged by a cam 9 of a clamping plate 5. The clamping plate 5 is in turn fastened to a clamping shoe 6 which is held against rotation in the tool holder I by a screw 7. The clamping plate 5 has on its upper surface a longitudinal groove and a transverse groove. A projection of the clamping shoe engages the longitudinal groove. The longitudinal groove is engaged by a projection of the clamping shoe 6. Moreover, a projection 15 is disposed transversely on the clamping shoe 6. This projection 15 engages the transverse groove or notch 14 such that a component of force is produced in the direction of the screw 7 (see FIGS. 2 to 6). The clamping plate 5 is thus always drawn toward the screw 7 by the projection 15 in conjunction with the notch 14. On each of the two longitudinal sides of the clamping plate 5 there is a recess 16 which is engaged by a spring means 17 in the form of a U. The clamping plate 5 is urged upward against the clamping shoe 6 by this spring.

According to the invention, a cam 9 is disposed on the side of the clamping plate 5 facing the cutter insert. The height of this cam 9 is selected such that it will be situated between the bottom 10 and the top 11 of the recess (see FIGS. 3 and 4), to produce a thrusting contact. The cam on the clamping plate will thus contact the recess at its inclined or curved transition surface extending from the bottom to the top of the recess.

The bottom of the clamping plate 5 will rest fully on the top of the insert and completely cover the recess 4. The contact of the cam 9 of the clamping plate 5 with the recess 4 can be a point contact, linear contact or areal contact. The best results are obtained by a point contact. For this purpose the cam 9 can be cylindrical, barrel-shaped or spherical in shape. The width of the cam 9 is, of course, smaller than the width of the recess 4 so that the cam 9 can be engaged in the recess 4.

For better chip removal, the external contour of the cutter insert 5 facing the workpiece (not shown) is provided with ramps 12 which merge with the top of the clamping plate 5 ahead of the clamping shoe 6. For further protection against chips falling on it, the top of the plate 5 in front of the clamping shoe 6 is higher than the surface of the clamping plate 5 that is beneath the clamping shoe 6. The top of the clamping plate 5 ahead of the clamping shoe 6 thus acts, in part, as a shield.

To prevent the clamping shoe 6 from rotating on the tool holder 1, ribs 18 are provided on the flanks of the shoe 6 and they mesh with matching grooves in the tool holder.

Figure 2:
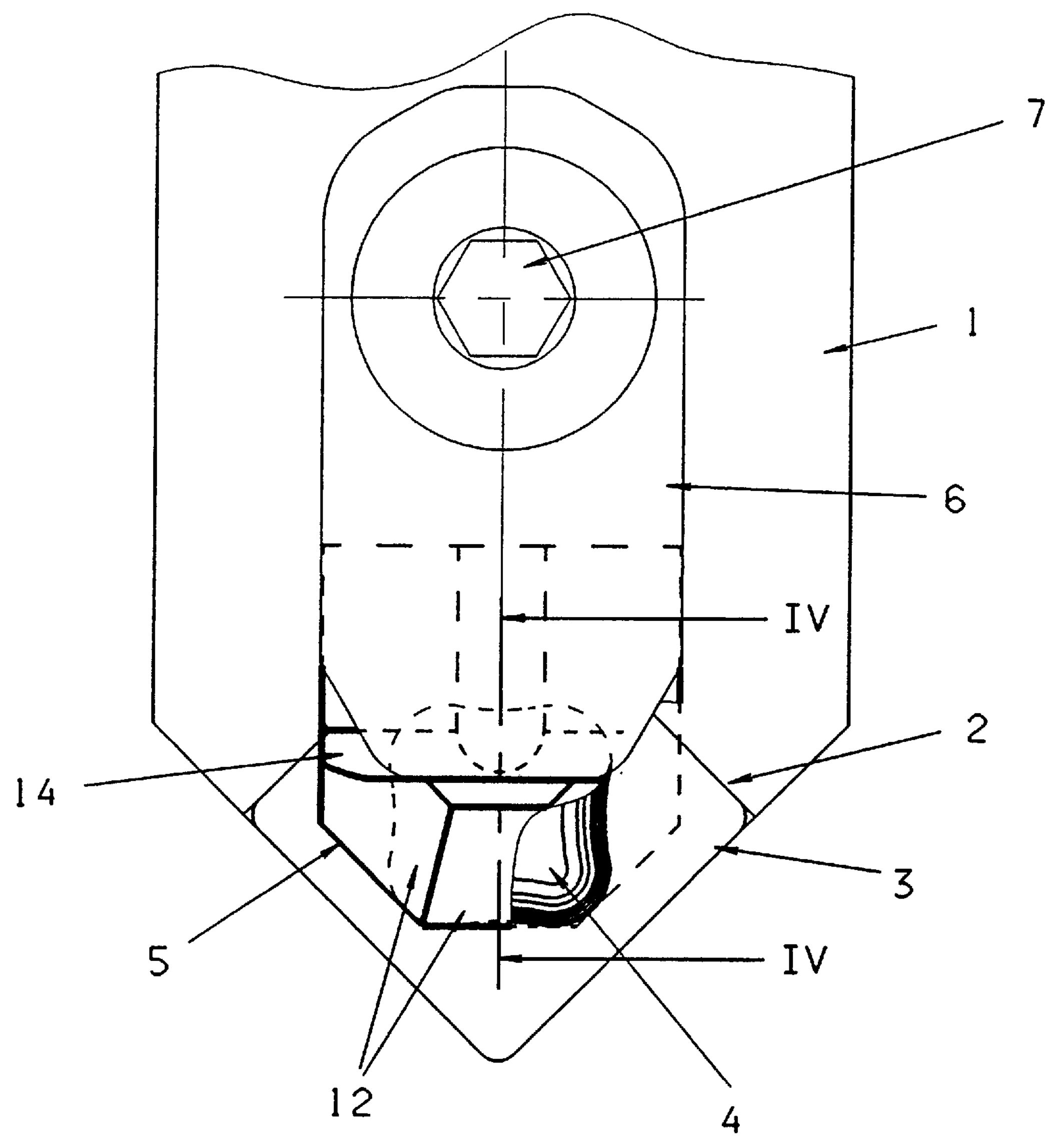

FIG. 2 shows a top plan view of a prismatic cutter insert 3 whose recess 4 is covered by a clamping plate 5 with a cam. Easily seen are the ramps 12 on the front end of the insert 5. The embodiment here represented is identical to that of FIG. 1.

Figure 3:
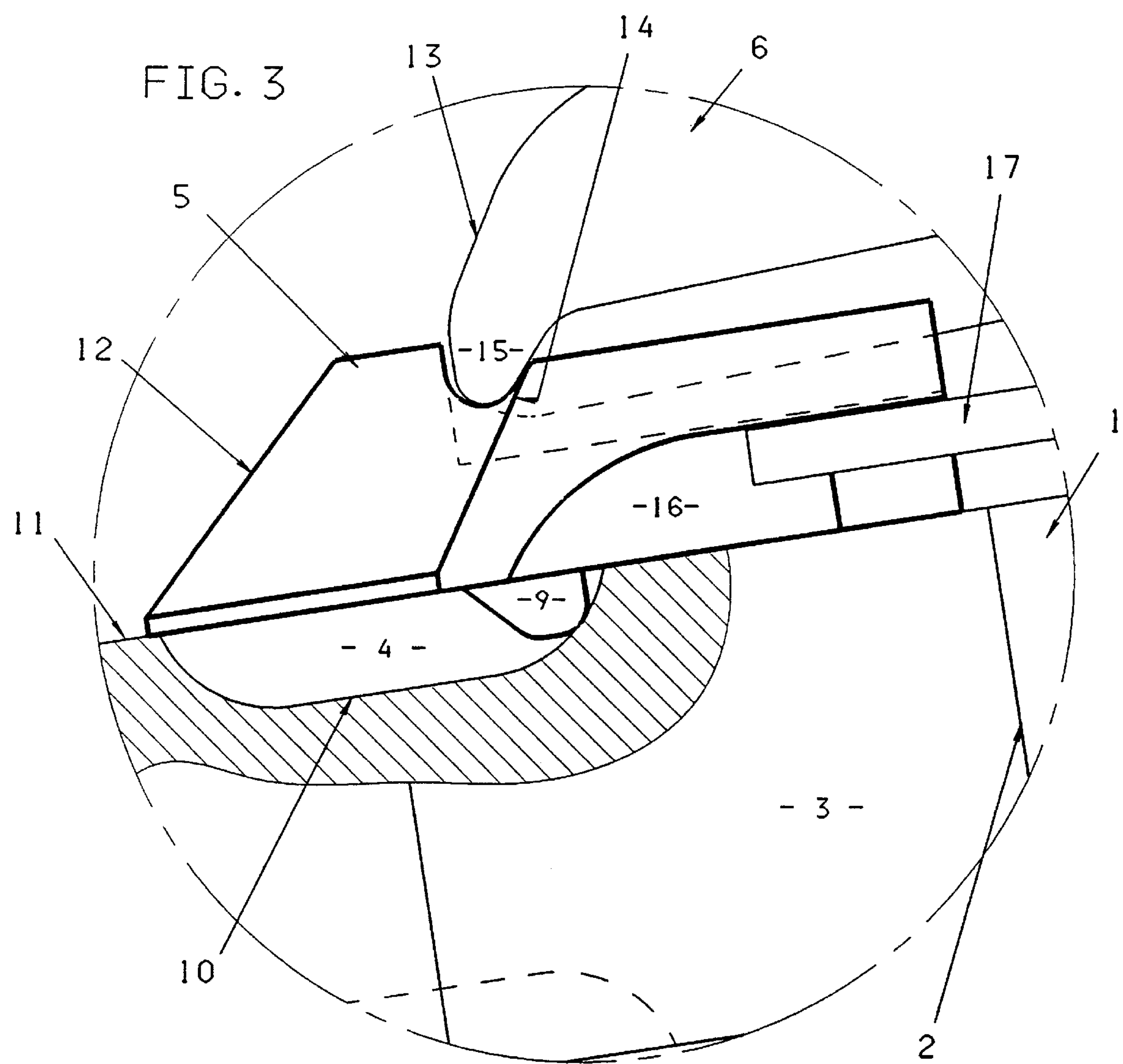
Figure 4:
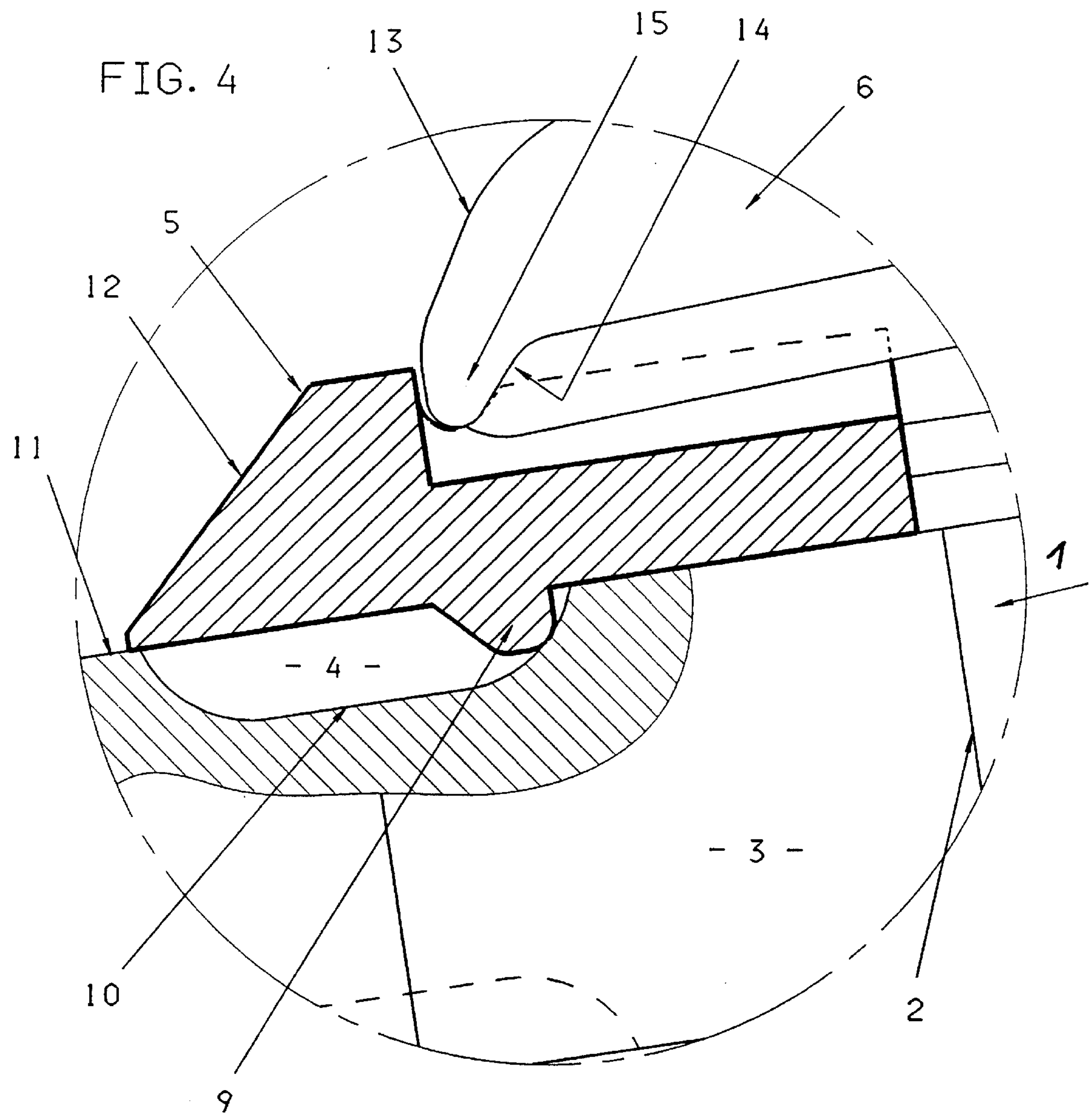

FIGS. 3 and 4 each show a cross section through the cutting tool as in FIG. 1, but on an enlarged scale. FIG. 4 shows a section taken along view line IV—IV of FIG. 2, and in FIG. 3 is shown an enlarged section of FIG. I within the circle III.

Figure 5:
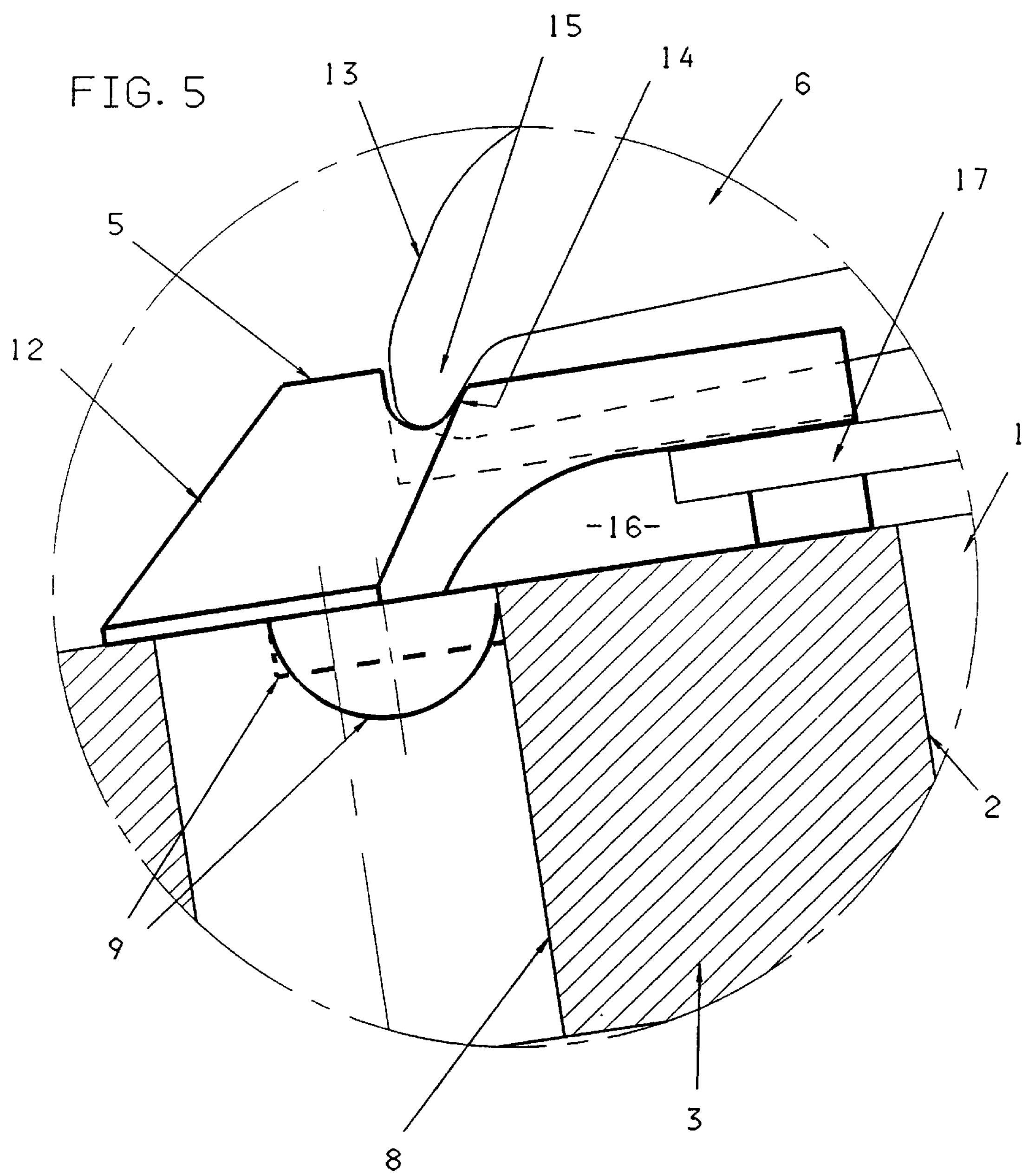

FIG. 5 shows in cross section a clamping plate 5 with a cylindrical or hemispherical cam 9 engaged in a cylindrical bore 8 of a cutter insert 3. The cylindrical shape of cam 9 is represented in broken lines. The height of cam 9 is in this embodiment of secondary importance. It must, however, make a tightening contact. Otherwise this embodiment is identical to the ones shown previously.

Figure 6:
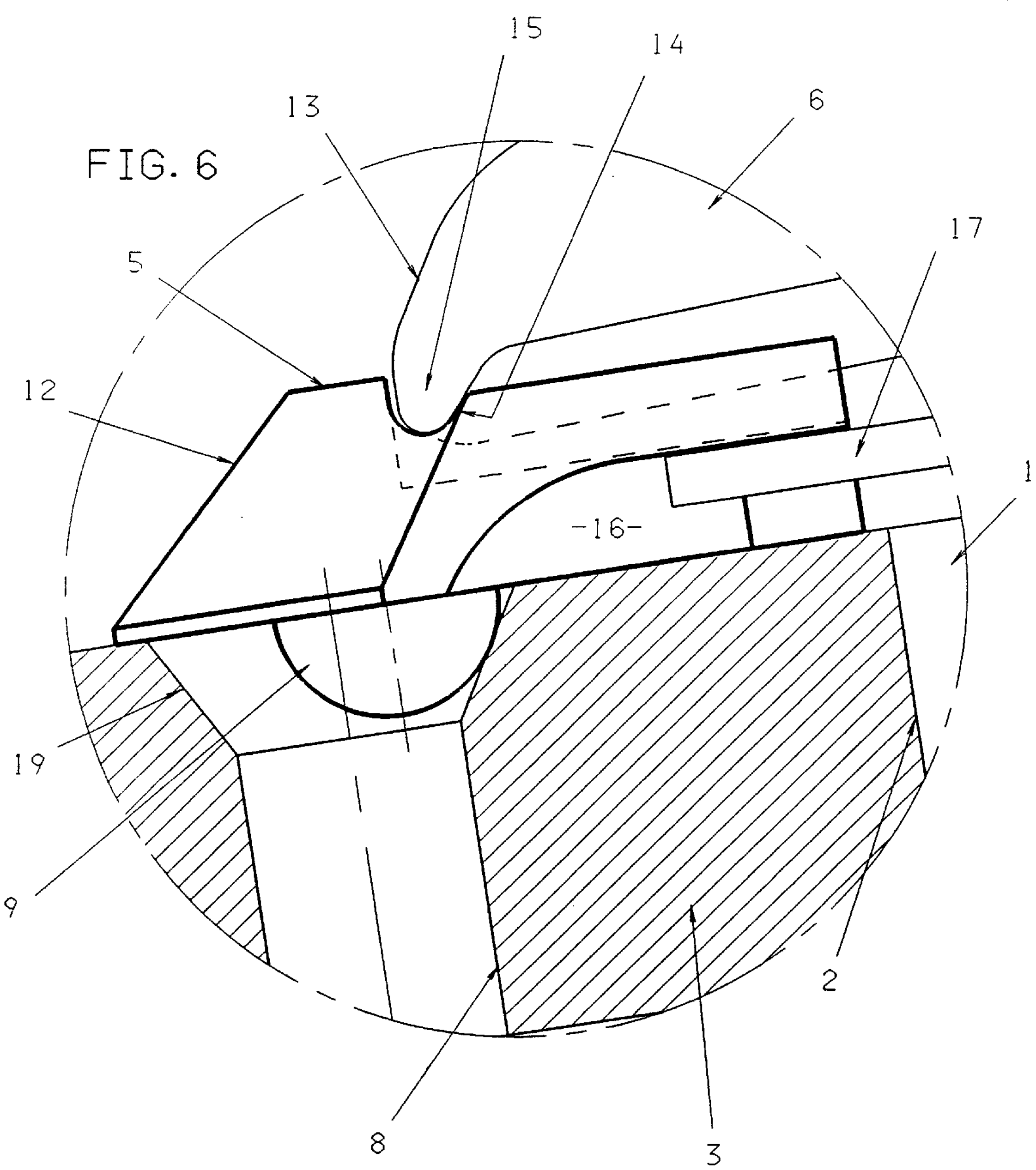

FIG. 6 shows an embodiment comparable to Fig.5, only here the hemispherical cam 9 is engaged in a conical or flaring bore 19. Otherwise this embodiment is also identical with the ones shown previously. The bore or flare 19 can also be conical, spherical or the like in shape.

It will be understood that the specification and examples are illustrative but not limitative of the present invention and that other embodiments within the spirit and scope of the inventions will suggest themselves to those skilled in the art.

We claim:

1. A lathe cutting tool assembly for machining a workpiece, said lathe cutting tool assembly comprising:

a tool holder having an opening therein;

a cutter insert positioned in said opening, the cutter insert having a clamping recess therein;

a clamping shoe which secures the insert in the tool holder, the clamping shoe being secured to the tool holder by a screw;

a clamping plate secured to the clamping shoe and in contact with the cutter insert;

said clamping plate having a bottom facing the cutter insert and including a cam on said bottom which is in clamping contact with the cutter insert in said recess;

said clamping shoe having a front portion engaging an upper surface of said clamping plate so as to draw said clamping plate in a backward direction toward said screw; and the clamping plate having an upper portion forwardly of the clamping shoe, said upper portion extending upwardly higher than the surface of the clamping plate that is beneath the clamping shoe and so that the clamping plate upper portion protects the front portion of the clamping shoe against impinging chips.

2. The lathe cutting tool assembly of claim 1 wherein the cutting tool is a turning chisel.

3. The lathe cutting tool assembly of claim 1 wherein the recess is defined to have a bottom and a top, and the cam on the clamping plate has a height which extends intermediate the recess bottom and the recess top.

4. The lathe cutting tool assembly of claim 1 wherein the contact between the cam of the clamping plate and the recess is a contact at a point, at a line, or over an area.

5. The lathe cutting tool assembly of claim 1 wherein the cam is of a cylindrical, barrel or spherical shape.

6. The lathe cutting tool assembly of claim 1 wherein the cam has a width less than the width of the recess.

7. The lathe cutting tool assembly of claim 1 wherein the clamping plate substantially covers the recess.

8. The lathe cutting tool assembly of claim 1 wherein the clamping plate has an external contour facing the workpiece, said external contour having at least one ramp merging with the upper side of the clamping plate in front of the clamping shoe.

9. The lathe cutting tool assembly of claim 1 wherein the clamping plate upper surface has a sloping plane or a notch engaging with the clamping shoe such that a component of force is produced in the clamping plate drawing said clamping plate toward the screw.

10. The cutting tool assembly of claim 1 wherein the recess is defined to have a bottom and a top, and the recess has an inclined or curved transition surface extending from the bottom to the top.

11. The cutting tool assembly of claim 10 wherein the cam contacts the cutting insert at the transition surface.

12. The cutting tool assembly of claim 1 wherein the recess is a bore.

13. The cutting tool assembly of claim 1 wherein the front portion of the clamping shoe extends vertically and slantingly backward above said upper portion of said clamping plate so that chips passing over said upper portion are deflected away from where the clamping shoe engages the clamping plate.

* * * * *